United States Patent
Grigoriev et al.

(10) Patent No.: US 8,019,055 B2
(45) Date of Patent: Sep. 13, 2011

(54) MEDIA INSTANT MESSAGING FOR MOBILE DEVICE

(75) Inventors: Nikolai Grigoriev, Brossard (CA); Haraldur Thorkelsson, Montreal (CA); Jean Regnier, Laval (CA)

(73) Assignee: Nokia Corporation, Espoo (FI)

( * ) Notice: Subject to any disclaimer, the term of this patent is extended or adjusted under 35 U.S.C. 154(b) by 1208 days.

(21) Appl. No.: 11/624,889

(22) Filed: Jan. 19, 2007

(65) Prior Publication Data

US 2008/0177840 A1 Jul. 24, 2008

(51) Int. Cl.
*H04M 1/64* (2006.01)
*G06F 15/16* (2006.01)

(52) U.S. Cl. ............... 379/88.17; 370/352; 379/202.01; 379/265.02; 455/405; 455/413; 455/414.2; 455/456.1; 455/466; 705/77; 709/204; 709/206; 709/225; 715/747

(58) Field of Classification Search ............... 379/88.17, 379/93.24, 202.01, 265.02; 455/405, 456.1, 455/413, 414.2, 466; 709/204, 206, 207, 709/225; 715/747; 370/352; 705/77
See application file for complete search history.

(56) References Cited

U.S. PATENT DOCUMENTS

| | | | |
|---|---|---|---|
| 6,782,081 B2 * | 8/2004 | Malik ......................... | 379/93.24 |
| 6,807,565 B1 | 10/2004 | Dodrill et al. | |
| 6,957,077 B2 | 10/2005 | Dehlin | |
| 6,990,180 B2 | 1/2006 | Vuori | |
| 7,013,155 B1 | 3/2006 | Ruf et al. | |
| 7,058,036 B1 | 6/2006 | Yu et al. | |
| 7,085,259 B2 | 8/2006 | Wang et al. | |
| 7,376,703 B2 * | 5/2008 | Colson et al. ................. | 709/206 |
| 7,675,903 B2 * | 3/2010 | Ozugur et al. ................ | 370/352 |
| 7,747,685 B2 * | 6/2010 | Chen et al. .................... | 709/204 |
| 2003/0229670 A1 * | 12/2003 | Beyda ........................... | 709/206 |
| 2005/0069116 A1 * | 3/2005 | Murray, II ................ | 379/202.01 |
| 2005/0132013 A1 * | 6/2005 | Karstens ....................... | 709/206 |
| 2006/0036689 A1 * | 2/2006 | Buford et al. ................. | 709/206 |
| 2006/0089971 A1 * | 4/2006 | Wilensky ...................... | 709/206 |
| 2006/0245578 A1 * | 11/2006 | Bienfait et al. .......... | 379/265.02 |
| 2007/0225017 A1 * | 9/2007 | Li et al. ...................... | 455/456.1 |
| 2008/0028027 A1 * | 1/2008 | Jachner ......................... | 709/206 |
| 2008/0028031 A1 * | 1/2008 | Bailey et al. .................. | 709/207 |
| 2008/0125079 A1 * | 5/2008 | O'Neil et al. ................. | 455/405 |
| 2008/0147795 A1 * | 6/2008 | Heidloff et al. .............. | 709/204 |
| 2008/0177840 A1 * | 7/2008 | Grigoriev et al. ............ | 709/206 |
| 2009/0144634 A1 * | 6/2009 | Berger .......................... | 715/747 |

* cited by examiner

*Primary Examiner* — Gerald Gauthier
(74) *Attorney, Agent, or Firm* — Ditthavong Mori & Steiner, P.C.

(57) ABSTRACT

In an instant messaging system, message latency is reduced by initiating traffic channel set-up at a receiving device concurrently while a sending device is generating the instant message. When a user begins generating an instant message, the sending device transmits a service request to a payload and connection server to indicate that an instant message is pending. Upon receipt of the service request, the payload and connection server notifies the receiving device so that the receiving device can initiate traffic channel set-up concurrently while the instant message is being recorded. When the traffic channel is established, the receiving device polls the server. If the instant message is not yet received by the payload and connection server when the polling request is received, the payload and connection server waits a predetermined period of time to receive the pending instant message and forwards the instant message when it is received.

20 Claims, 13 Drawing Sheets

MEDIA INSTANT MESSAGING FOR MOBILE DEVICE

BACKGROUND

The present invention relates generally to instant messaging applications for mobile devices and, more particularly, to a method and system for reducing latency in media instant messaging applications.

The introduction of Third Generation (3G) networks has led to increased consumer demand for mobile data services. One of the services in greatest demand by mobile users is instant messaging (IM). IM is a form of real-time communication between two or more people. IM requires a client application on the mobile device that can communicate with an instant messaging server. Originally, instant messaging applications were limited to text messaging, but many instant messaging applications may now provide support for audio and/or video messages.

In most instant messaging applications, the instant message is created by a sender and subsequently sent when the message is complete. For voice instant messages, for example, the sender typically holds a record button or record key and records a voice instant message. When the button or key is released, recording stops and the voice instant message is sent to the instant messaging server. Upon receipt, the instant messaging server notifies the recipient, and establishes a traffic channel to deliver the voice instant message to the recipient. The delay between the time that the voice instant message is sent and the time that it is delivered to the recipient is referred to herein as the message latency. One of the primary contributors to message latency is the time required to set up a traffic channel. Due to consumer expectations, message delays greater than 10 seconds may not be tolerable. Therefore, there is a need to reduce message latency, particularly for media instant messaging.

SUMMARY

The present invention reduces message latency in a media instant messaging system by initiating traffic channel set-up at a receiving device concurrently with a message being created by the sending device. In one embodiment, the media instant message comprises a voice instant message. A user begins recording a voice instant message at the sending device. While the voice instant message is being recorded, the sending device transmits a service request to a payload and connection server to indicate that a voice instant message is pending. Upon receipt of the service request, the payload and connection server notifies the receiving device. This notification allows the receiving device to initiate a traffic channel set-up process while the user is still recording the voice instant message.

Once the traffic channel is established, the receiving device sends a polling request to the payload and connection server. If the payload and connection server receives the polling request before it receives the voice instant message from the sending device, the payload and connection server waits a predetermined period of time to receive the voice instant message. Once the payload and connection server receives the voice instant message, the payload and connection server responds to the polling request by forwarding the voice instant message to the receiving device.

DETAILED DESCRIPTION

Figure 1:
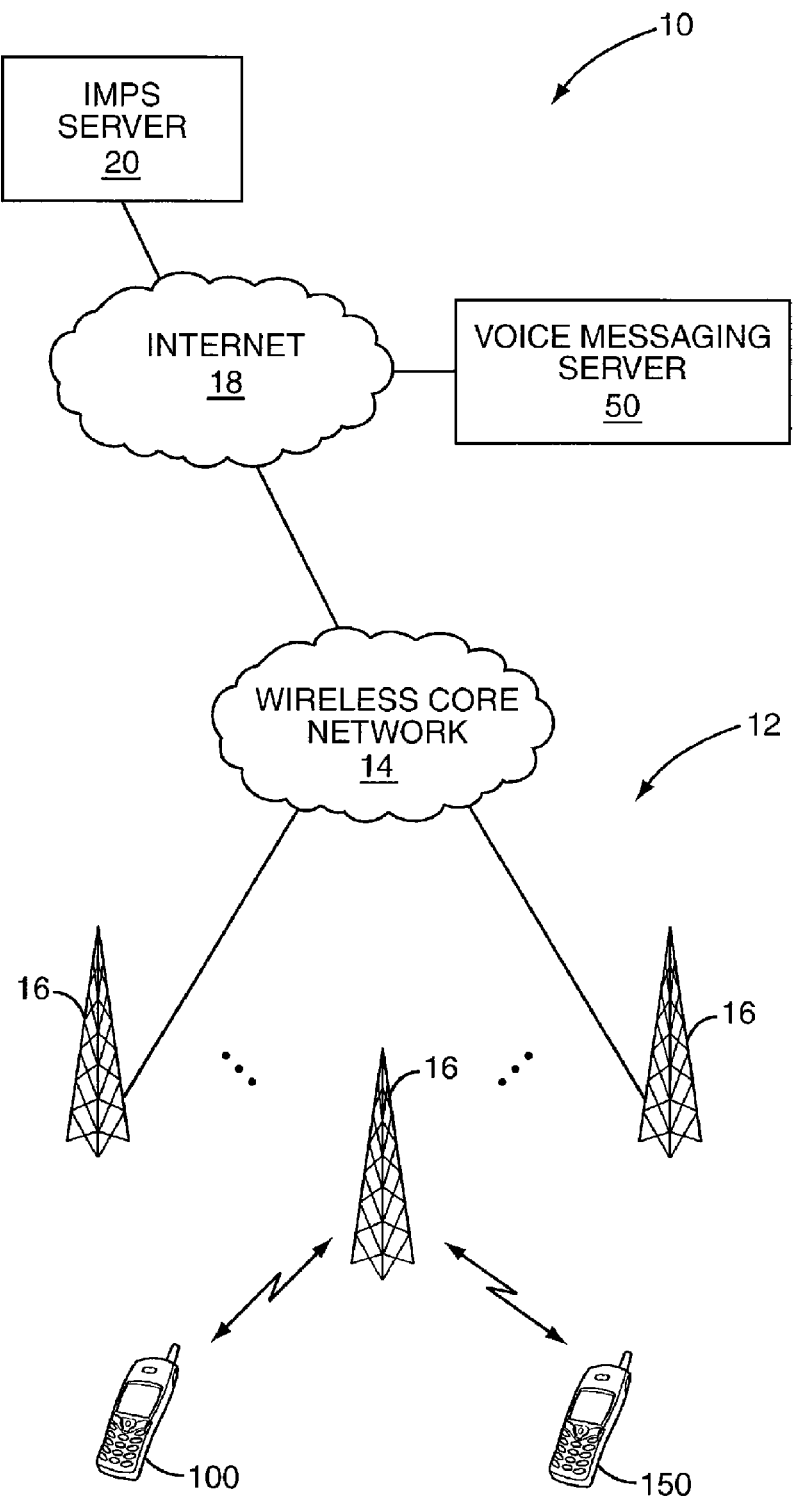
FIG. 1 is a block diagram of a communication network including a payload and connection server according to one embodiment of the present invention.

Referring now to the drawings, the present invention will be described in the context of a mobile communication network 10 providing a voice instant messaging and presence service (IMPS) for mobile subscribers. However, this is for illustrative purposes only. Those skilled in the art will readily appreciate that the present invention may be used for any type of instant messaging and presence service. Such services include, but are not limited to, those that communicate voice instant messages, audio instant messages, video instant messages, or text instant messages, or any combination thereof.

FIG. 1 illustrates two mobile devices denoted as the sending device 100 and the receiving device 150. The network 10 comprises a plurality of mobile devices having IMPS clients, a wireless access network 12 for communicating with the mobile devices 100, 150 and a wireless core network 14 providing connection to the Internet 18 or other packet data network.

The wireless access network 12 preferably comprises a packet-switched network, such as a GPRS, cdma2000, WCDMA, or WiMAX network, and includes one or more base stations 16 or other wireless access points. An IMPS server 20 connects to the Internet 18, or, alternatively, may reside in the wireless core network 14. The IMPS server 20 provides text instant messaging and presence services to the mobile devices 100, 150.

A payload and connection server 50, in cooperation with the IMPS server 20, provides voice instant messaging services; however, as stated above, the payload and connection server 50 may provide any audio and/or video and/or text instant messaging services in cooperation with the IMPS server 20. Those skilled in the art will appreciate that, in some embodiments, the functionality represented by the payload and connection server 50 may be included in the IMPS server 20. The IMPS server 20 and payload and connection server 50 may reside on the same network node, and may be implemented as two distinct server applications or as a single integrated server application. The arrangement illustrated in FIG. 1 is advantageous in that it allows operators to easily add voice or other media instant messaging services to systems that already have an IMPS server 20 for text instant messaging.

In one exemplary embodiment, the IMPS server 20 and the payload and connection server 50 are configured according to the Open Mobile Alliance (OMA) standard Instant Messaging Presence Service (IMPS) Architecture "OMS-AD-IMPS-V1_3-20051011-C" dated Oct. 11, 2005. The IMPS server 20 may communicate messages according to the OMA Client-Server Protocol Session and Transactions standards set forth in "OMA-TS-IMPS-CSP-V1_3-20060606-C" dated Jun. 6, 2006. Both of these documents are incorporated herein by reference in their entirety.

In another embodiment, the IMPS server 20 may also be configured to communicate according to the Session Initiation Protocol (SIP). In this embodiment, the IMPS server 20 may include logic that converts messages between IMPS and SIP protocols. An example of a server suitable for this use is described in U.S. Patent Application Publication No. 2005/0213537 entitled "Internetworking Gateway and Method," which was filed on Feb. 28, 2005, and which is incorporated herein by reference in its entirety.

The mobile devices 100, 150 have an IMPS client (not shown) for communicating with the IMPS server 20 and payload and connection server 50. The IMPS client is a software application that is executed on a processor and provides support for IMPS services to user applications, such as an instant messaging (IM) application or presence enhanced phone book. For purposes of the present invention, it is assumed that the IM application for the mobile devices 100, 150 support voice IM. The users of the mobile devices 100, 150 register with the IMPS server 20 for instant messaging and presence services. Once registered, the mobile devices 100, 150 can exchange voice instant messages, publish presence information, and subscribe to presence updates from other IMPS users.

For voice instant messages, the user of the sending device 100 typically holds a record button or record key and records a voice instant message. When the button or key is released, recording ceases and the voice instant message is sent. Conventionally, the payload and connection server 50 receives the voice instant message and notifies the user. Additionally, the payload and connection server 50 also sets up a traffic channel to deliver the voice instant message to the receiving device. The time required to establish this traffic channel, however, is one of the primary contributors to message latency.

The present invention reduces this message latency by allowing the receiving device 150 to initiate traffic channel set-up before the user completes recording the voice instant message at the sending device. To briefly summarize, the instant messaging application on the sending device 100 sends an IM service request to the payload and connection server 50 when voice recording commences and before voice recording is complete. The payload and connection server 50 can then directly or indirectly notify the receiving device 150 of the pending voice instant message so that the receiving device 150 can initiate traffic channel set-up concurrently while the voice instant message is being recorded. When the traffic channel is established, the receiving device 150 sends a polling request to the payload and connection server 50. If the payload and connection server 50 receives the voice instant message before it receives the polling request, the payload and connection server 50 forwards the voice instant message to the receiving device 150 upon receipt of the polling request. If the payload and connection server 50 receives the polling request before it receives the voice instant message, the payload and connection server 50 may wait a predetermined time period for the voice instant message to be received before responding to the polling request.

Figure 2:
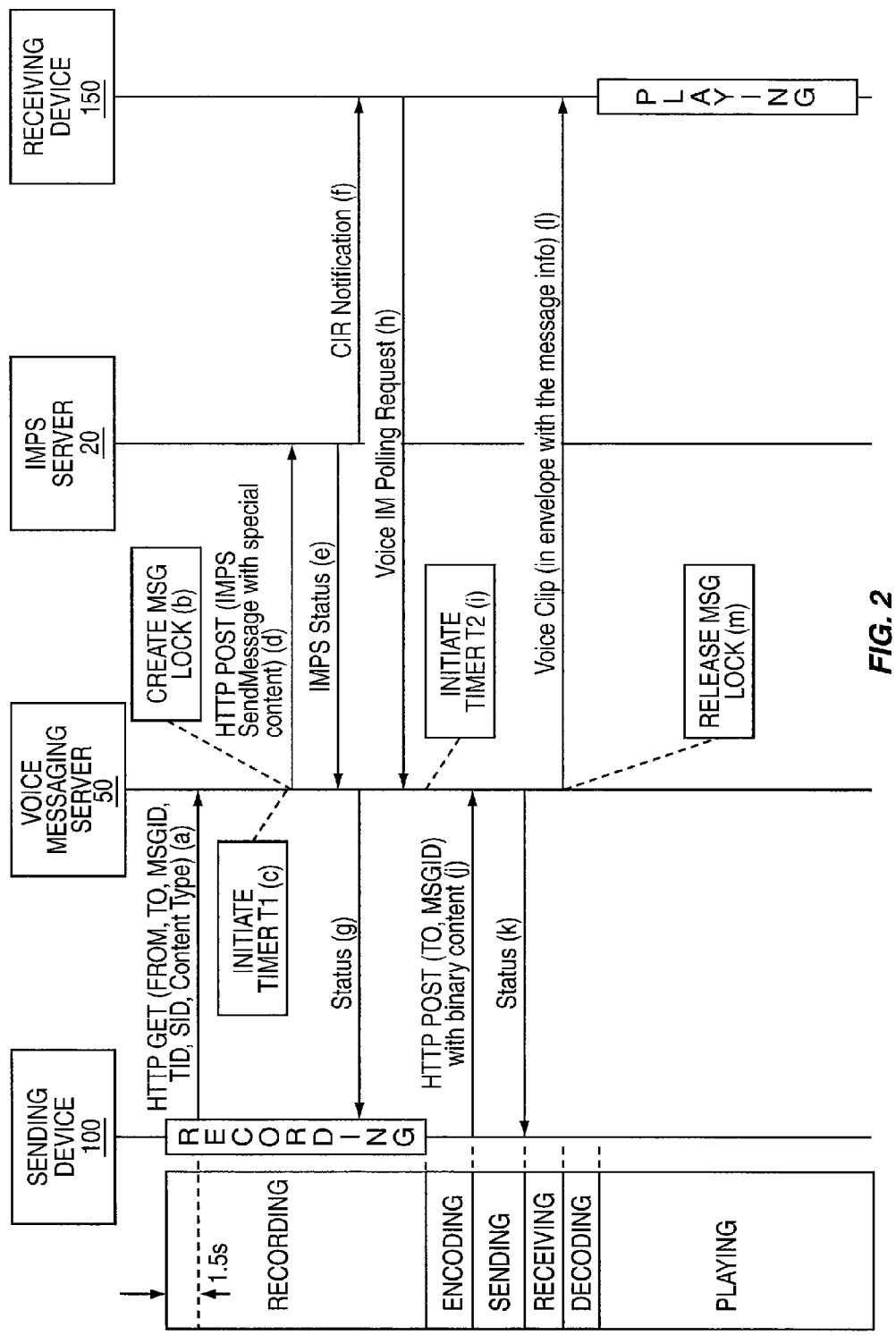
FIG. 2 is a call flow diagram illustrating an exemplary process for sending a voice instant message from a sending device to a receiving device in a voice instant messaging system according to one embodiment of the present invention.

FIG. 2 illustrates an exemplary method for delivering voice instant messages according to one embodiment of the present invention. The payload and connection server 50 and IMPS server 20 are illustrated in FIG. 2 as separate servers. The sender initiates the process when the sender begins recording a voice instant message on the sender's device. Shortly after the sender begins recording, the sending device 100 sends a service request to the payload and connection server 50 to notify the payload and connection server 50 that a voice instant message is pending (step a). In this example, HTTP is used as the signaling protocol between the IMPS client on the sending device 100 and the payload and connection server 50. The service request message may thus comprise an HTTP GET message where the content type specifies audio content. In response, the payload and connection server 50 creates a message lock for the pending voice message, which is uniquely identified in the HTTP GET message by a message identifier (step b). After the message lock is created, the payload and connection server 50 initiates a timer T1 (step c) and sends a notification to the IMPS server 20 (step d). The notification message may comprise an HTTP POST message with special content. The IMPS server 20 in turn acknowledges the service request by sending an IMPS STATUS message (step e) and then sends a Communication Initiation Request (CIR) Notification message to the receiving device 150 (step f) to initiate traffic channel set-up by the receiving device 150. Alternatively, the payload and connection server 50 could send a Communication Initiation Request (CIR) Notification message directly to the receiving device 150 to initiate traffic channel set-up. In some embodiments, the CIR Notification message may include special content, such a poll flag, to indicate that a voice instant message is pending. The payload and connection server 50 sends an IMPS STATUS message to the sending device 100 to acknowledge the HTTP Get message (step g). CIR notification may take as long as 15 seconds, and traffic channel set-up make take as long as 7 to 8 seconds. Performing these transactions while the user is still recording the voice instant message can therefore substantially reduce message latency.

Upon receiving the CIR Notification message, the receiving device 150 establishes a traffic channel over which it can receive the pending voice instant message. Traffic channel set-up proceeds even though the sending device 100 may not be finished recording the voice instant message. Allowing traffic channel set-up to proceed concurrently while the voice instant message is being recorded can significantly reduce message latency. When the traffic channel is established, the receiving device 150 sends a Voice IM Polling Request directly to the payload and connection server 50 to request delivery of the voice instant message (step h).

The present invention employs a Polling Request message that is smaller in size than a standard IMPS Polling Request message. This smaller message size hastens the sending of the polling request and, depending on the radio access technology, helps to maintain the traffic channel. Particularly, some conventional systems may release the traffic channel if the traffic channel remains idle for too long. Reestablishing the channel may require a significant amount of time, which adds to latency. By keeping the polling request message size small, the present invention allows the receiving device 150 to continue polling at a defined periodicity. Thus, the receiving device 150 can maintain the traffic channel while waiting for a response to the Voice IM Polling Request.

When the payload and connection server 50 receives the Voice IM Polling Request, it checks whether a message lock exists. If so, the payload and connection server 50 determines whether it has received the pending voice instant message from the sending device 100. If so, it forwards the voice instant message to the receiving device 150. In this example, however, it is assumed that the voice instant message is not yet received by the payload and connection server 50 when the Voice IM Polling request is received from the receiving device 150. In this scenario, the payload and connection server 50 initiates a second timer (T2) (step i) and waits for the pending voice instant message. The duration of timer T2 may, for example, be in the order of 30-40 seconds. If the voice instant message is received from the sending device 100 in this time frame (step j), the payload and connection server 50 acknowledges the voice instant message by sending an IMPS STATUS message to the receiving device 150 (step k). The payload and connection server 50 then forwards the voice instant message to the receiving device 150 (step l). The payload and connection server 50 may forward the voice instant message, for example, by including the voice instant message within an IMPS transaction using binary XML. However, other methods are also possible. Once the voice instant message is sent to the receiving device 150, the payload and connection server 50 releases the message lock and stops the timers (step m). The receiving device 150 may then render the voice instant message to the user and/or store the voice instant message in memory.

Figure 3:
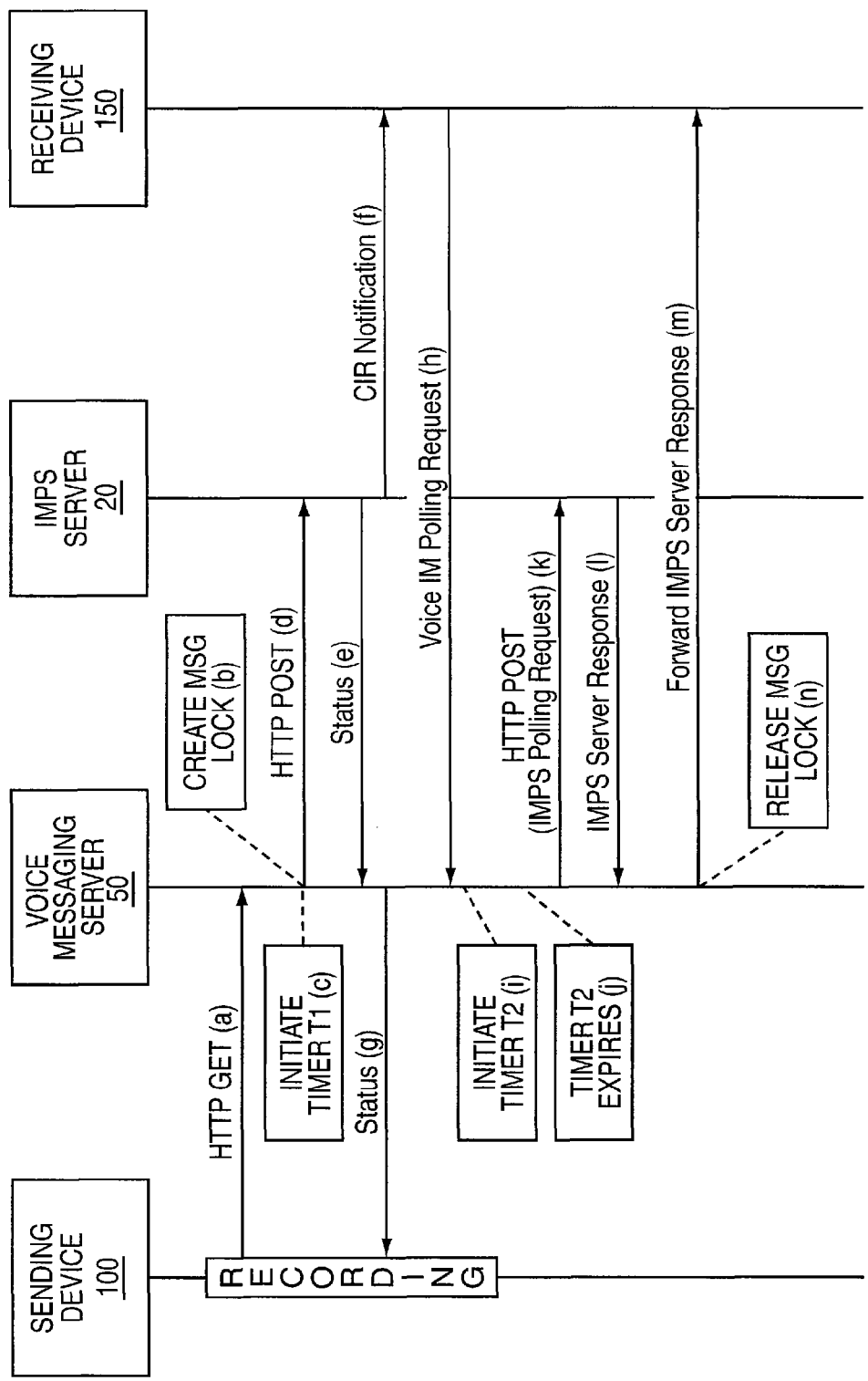
FIG. 3 is a call flow diagram illustrating how a payload and connection server responds to a time-out when the sending device does not provide the voice instant message within a predetermined time-out period.

In some scenarios, either or both of the timers T1, T2 may expire before the payload and connection server 50 receives the voice instant message from the sending device 100. FIG. 3, for example, illustrates a call flow where the timers T1, T2 expire before the payload and connection server 50 receives the voice instant message. In this embodiment, steps a-h are the same as previously described. The payload and connection server 50 sets the timer T2 when it receives the polling request (step i). When the timer T2 expires (step j), the payload and connection server 50 sends an IMPS Polling Request on behalf of the receiving device 150 to the IMPS server 20 (step k). When the IMPS server 20 responds (step l), the payload and connection server 50 may forward the response from the IMPS server 20 to the receiving device 150 (step m). The forwarded message may include a new text message or other information for the receiving device 150, or may be an empty response. In this call flow, timer T1 expires after forwarding the response from the IMPS server 20 (step n). When timer T1 expires, the payload and connection server 50 may release the message lock, stop the timers (step o), and notify the sending device 100 of the error (step p).

Those skilled in the art will appreciate that the particular poits at which the timers T1, T2 expire in FIG. 3 are for illustrative purposes only. Either or both of the timers T1, T2 may expire at any time.

Figure 4:
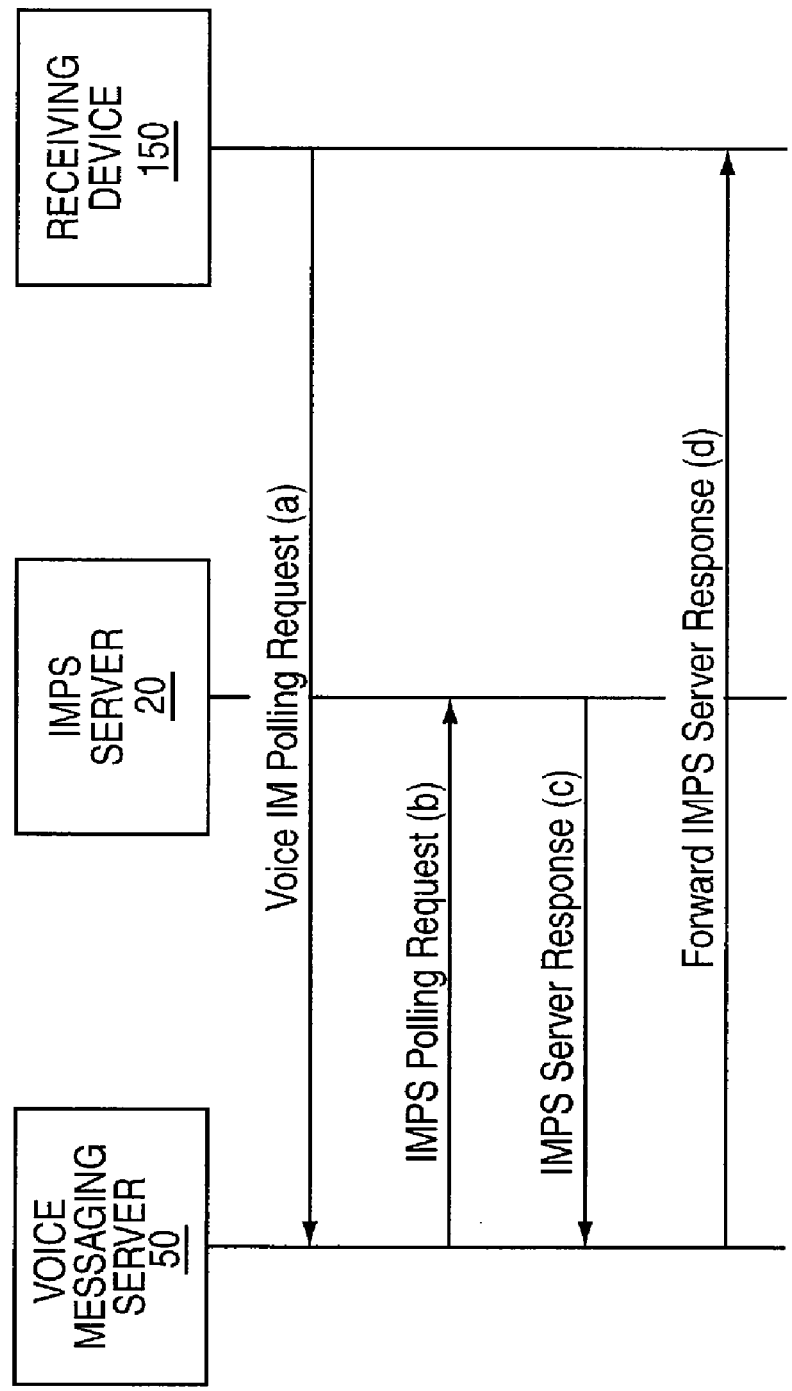
FIG. 4 is a call flow diagram illustrating how a payload and connection server responds to a polling request from a receiving device when no voice instant message is pending.

FIG. 4 illustrates a scenario where the payload and connection server 50 receives a Voice IM Polling Request from the receiving device 150 when no message lock exists. When the payload and connection server 50 receives the Voice IM Polling Request (step a), the payload and connection server 50 sends an IMPS Polling Request on behalf of the receiving device 150 to the IMPS server 20 (step b). When the IMPS server 20 responds (step c), the payload and connection server 50 forwards the response from the IMPS server 20 to the receiving device 150 (step d). The forwarded message may include a new text message or other information for the receiving device 150, or may be an empty response.

Figure 5:
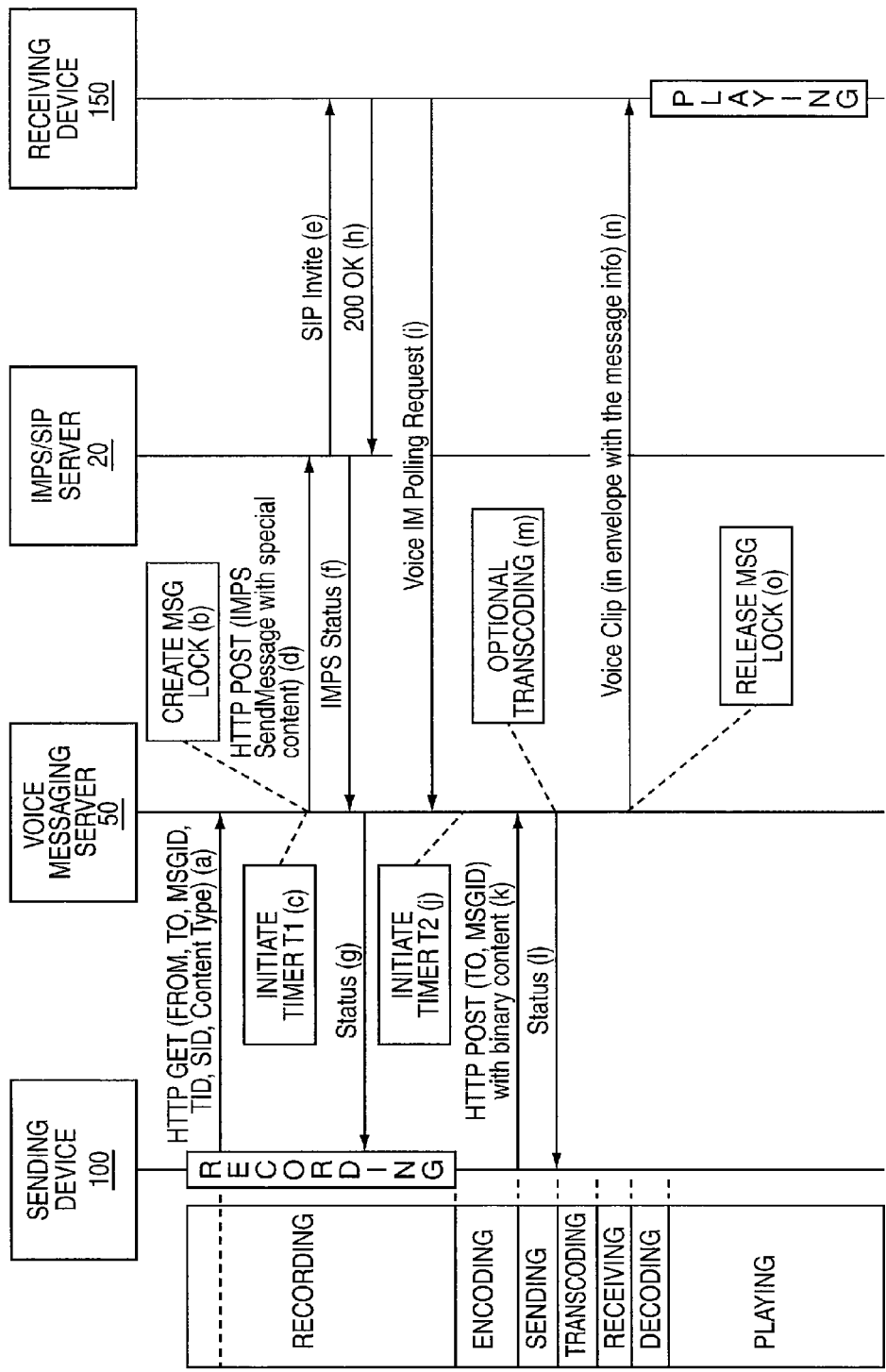
FIG. 5 is a call flow diagram illustrating a method according to another embodiment of the present invention for sending a voice instant message to a SIP-compliant receiving device.

FIG. 5 illustrates an exemplary method for delivering voice instant messages according to another embodiment of the present invention where the receiving device 150 has a Session Initiation Protocol (SIP) client. The sender initiates the process when the sender begins recording a voice instant message on the sending device 100. Shortly after the sender begins recording, the sending device 100 sends a service request to the payload and connection server 50 to notify the payload and connection server 50 that a voice instant message is pending (step a). HTTP is used as the signaling protocol between the IMPS client on the sending device 100 and the payload and connection server 50. As previously described the service request message may comprise an HTTP GET message where the content type specifies audio content. In response, the payload and connection server 50 creates a message lock for the pending voice instant message, which is uniquely identified in the HTTP GET message by a message identifier (step b). After the message lock is created, the payload and connection server 50 initiates a timer T1 (step c) and sends a notification message to the IMPS server 20 (step d). The notification message may be, for example, an HTTP GET message with special content. The IMPS server 20 then returns an IMPS STATUS message to the payload and connection server 50 (step f) which, in turn, sends an acknowledgement to the sending device 100 (step g).

The IMPS/SIP server 20 sends a SIP Invite message to the receiving device 150 to initiate traffic channel set-up (step e). The SIP Invite message includes a Session Description Protocol (SDP) defining one or more parameters that will be used during the session. These parameters may include, but are not limited to, a format to be used for the media, an indication that media is waiting for the user, the type of media that is waiting for the user, and the protocol (e.g., HTTP) and address (e.g., the URI) the user should use to obtain the media. The receiving device 150 replies with a SIP 200 OK message to establish the session with the IMPS/SIP server 20 and initiates traffic channel set-up (step h).

Typically, the receiving device 150 would accept the parameters in the SIP Invite message and initiate traffic channel set up. However, in some cases, the receiving device 150 may not be capable of functioning according to the received parameters. By way of example, the SIP Invite message may include a parameter that defines a media type that the receiving device 150 is incapable of decoding. In such cases, the receiving device 150 may reject one or more of the parameters and propose others instead.

Traffic channel set-up proceeds concurrently while the voice instant message is being recorded. When the traffic channel is established, the receiving device 150 sends a Voice IM Polling Request directly to the payload and connection server 50 to request delivery of the voice instant message (step i).

When the payload and connection server 50 receives the Voice IM Polling Request, it checks whether a message lock exists. In this example, it is assumed that the payload and connection server 50 has not yet received the voice instant message from the sending device 100 when it receives the Voice IM Polling request from the receiving device 150. The payload and connection server 50 then initiates a second timer (T2) (step j) and waits for the pending voice message from the sending device 100. The duration of timer T2 may, for example, be in the order of 30-40 seconds. If the voice instant message is received from the sending device 100 in this time frame (step k), the payload and connection server 50 acknowledges the voice instant message by sending an IMPS STATUS message to the sending device 100 (step l). Optionally, the payload and connection server 50 may transcode the voice instant message (step m), and forward the voice instant message to the receiving device 150 (step n). After forwarding the voice instant message, the payload and connection server 50 releases the message lock (step o). The voice instant message can then be played or stored in memory of the receiving device 150. If the T2 timer expires before the voice message is received, the payload and connection server 50 may release the message lock, stop the timers, and notify the sending device 100.

FIG. 5 illustrates only the receiving device 150 as having a SIP client; however, the present invention is not so limited. Those skilled in the art will realize that the sending device 100 may also have a SIP client in addition to, or in lieu of, the receiving device 150. Thus, the sending device 100 may have a SIP session with the payload and connection server 50. Additionally, the payload and connection server 50 may or may not use SIP to communicate with the IMPS/SIP server 20.

Figure 6:
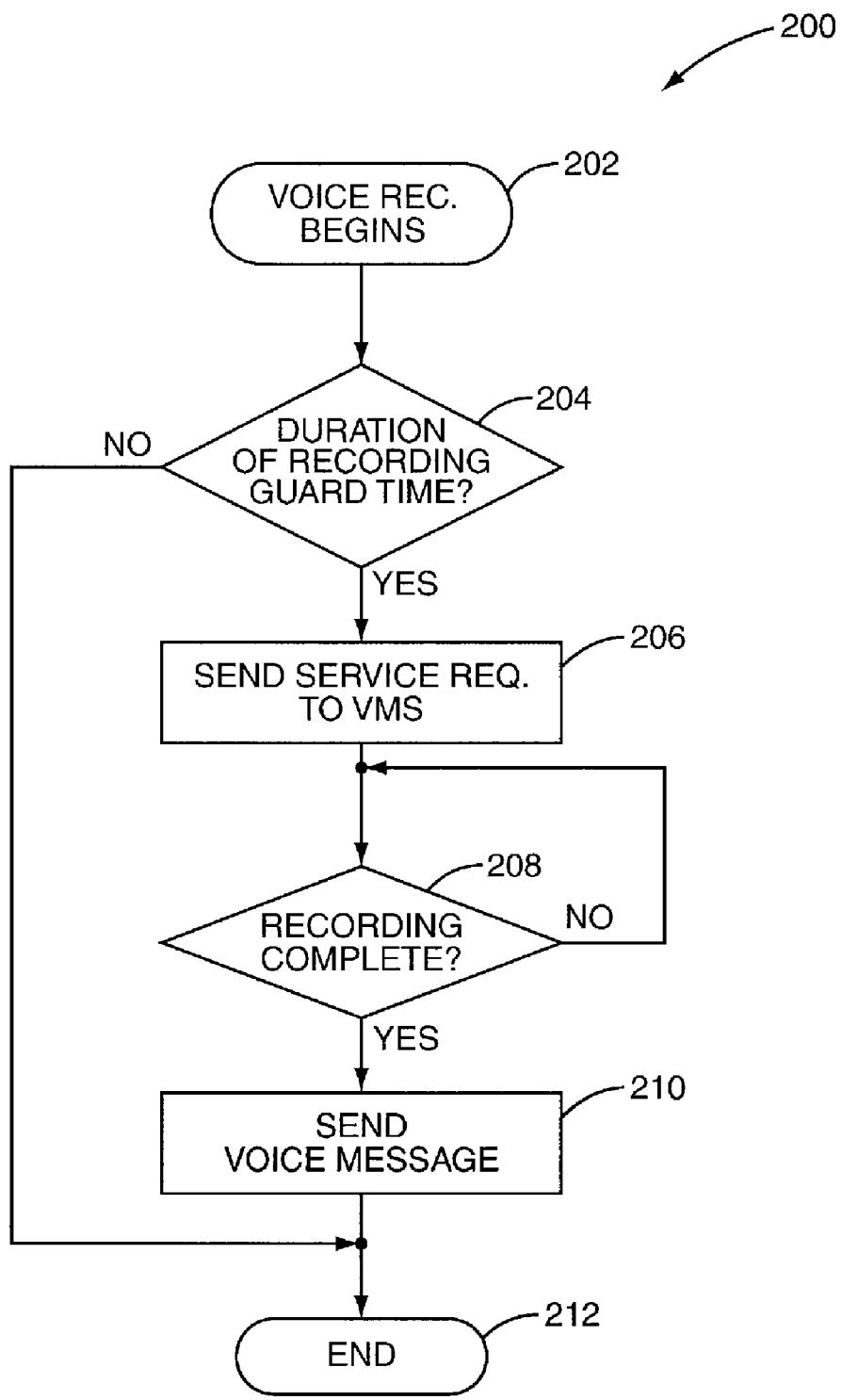
FIG. 6 illustrates a process implemented at a sending device for sending a voice instant message.

FIG. 6 illustrates an exemplary process 200 performed by the sending device 100 for sending a voice message. The process 200 starts when the user begins recording a voice instant message (block 202). The sending device 100 may, for example, include a record button or key that is depressed by the user to record a voice message. The sending device 100 can detect when the user depresses the record key, and in response to detecting this action initiate the process 200 shown in FIG. 6. After voice recording begins, the sending device 100 pauses for a predetermined time period (e.g., 1.5 seconds guard period) to avoid sending short messages (block 204). It is possible, for example, for the user to accidentally depress the record key for a short time period, or for the user's finger to inadvertently slip off the record key after recording begins. In these circumstances, it is not desirable to send the voice message.

Once the duration of the recording extends beyond the predetermined guard time, which may be configurable, the IM client sends a service request to the payload and connection server 50 indicating that a voice message is pending (block 206). However, voice recording continues at the sending device 100 until it is complete. When the voice recording is complete (block 208), the IM client on the sending device 100 forwards the voice instant message to the payload and connection server 50 (block 210) and the process ends (block 212). A limit (e.g., 30-40 seconds) may be set for the maximum length of the voice recording.

Figure 7:
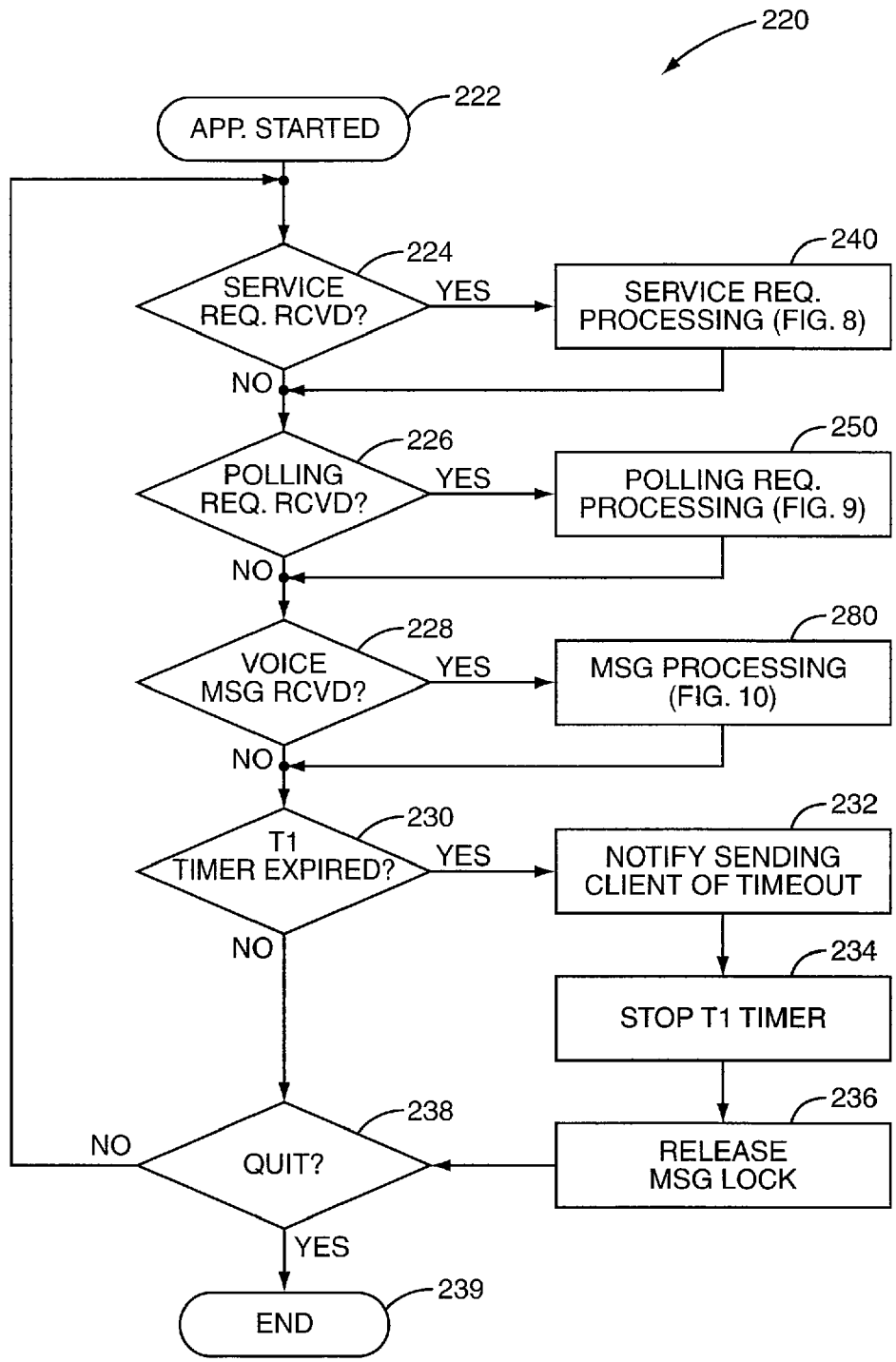
FIG. 7 illustrates a main control process implemented by a server application on the payload and connection server.
Figure 8:
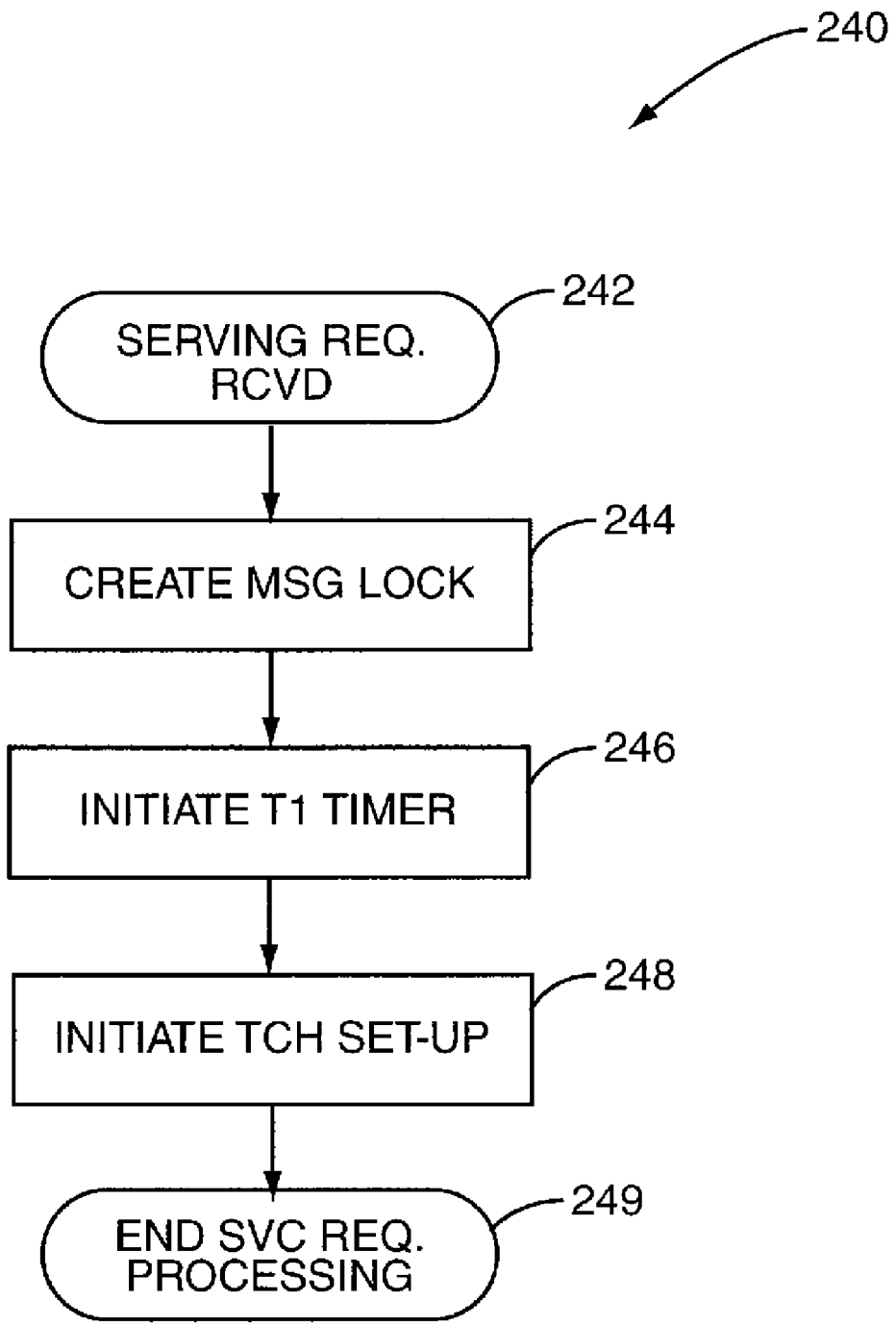
FIG. 8 illustrates an exemplary method for processing a service request implemented by a server application on a payload and connection server.
Figure 9:
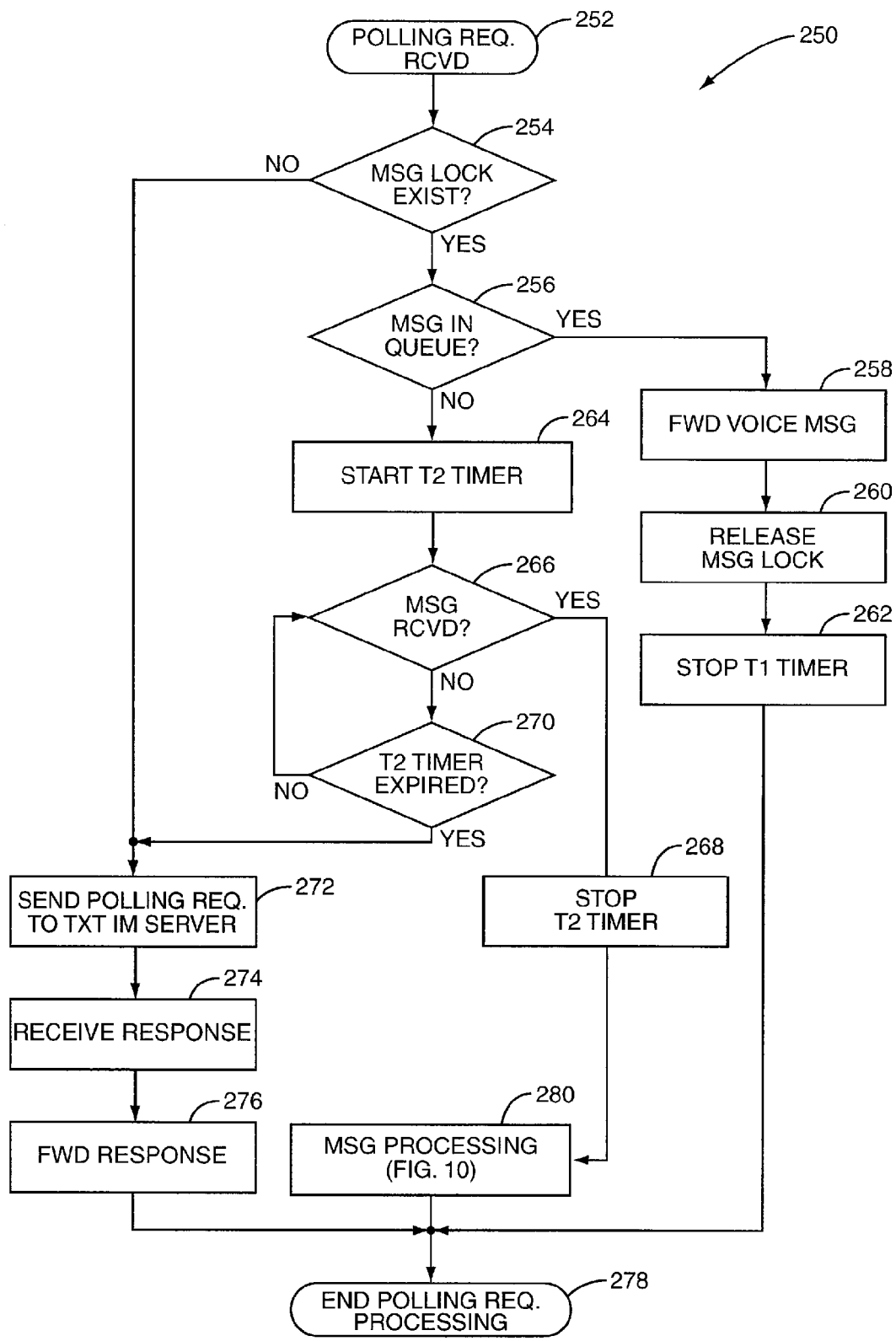
FIG. 9 illustrates an exemplary method for processing a polling request implemented by the server application on a payload and connection server.
Figure 10:
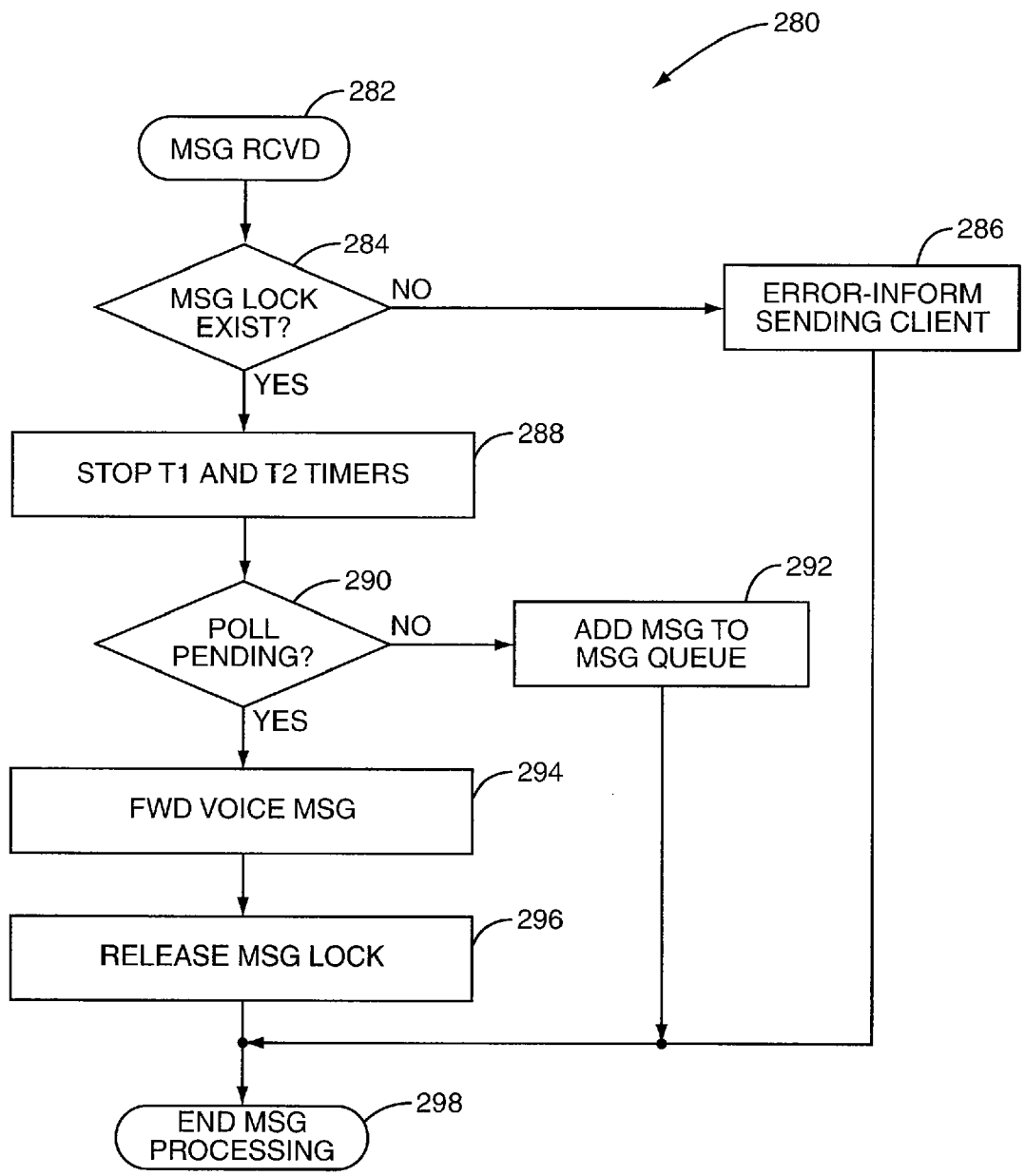
FIG. 10 illustrates an exemplary method for processing a received message implemented by a server application on a payload and connection server.

FIGS. 7-10 illustrate exemplary processes 220, 240, 250, and 280 performed by the server application on the payload and connection server 50. FIG. 7 illustrates main control processing 220. FIG. 8 illustrates the service request processing 240. FIG. 9 illustrates polling request processing 250. FIG. 10 illustrates message processing 280.

Referring to FIG. 7, the main control process 220 is initiated when the server application is started (block 222) and continues until the server application is closed. The main control process 220 responds to predetermined events and initiates the appropriate auxiliary processes responsive to those events. In the exemplary embodiment shown in FIG. 7, there are five main events: 1) the receipt of a service request from a sending device 100; 2) the receipt of a polling request from a receiving device 150; 3) the receipt of a voice instant message from a sending device 100; 4) the expiration of timer T1; and 5) a command to quit the application. When a service request is received (block 224), the server application initiates service request processing (block 240) as illustrated in FIG. 8. When a polling request is received (block 226), the server application initiates polling request processing 250, as shown in FIG. 9. When a voice instant message is received (block 228), the server application initiates message processing 280, as shown in FIG. 10. When timer T1 expires, the server application notifies the sending device 100 of the time-out (block 232), stops the T1 timer (block 234), and releases the message lock (block 236). When the server receives a command to quit the application (block 238), the main control process ends (block 239).

FIG. 8 illustrates the service request processing 240. As previously indicated, service request processing 240 begins when a service request is received (block 242). In response to the service request, the server application creates a message lock (block 244) and initiates the T1 timer (block 246). The server application also initiates traffic channel setup by the receiving device 150, for example, by sending a message to either the IMPS server 20 (e.g. HTTP Post) or to the receiving device 150 (e.g., CIR message) (block 248). Service request processing ends (block 249) after traffic channel setup is initiated.

FIG. 9 illustrates polling request processing by the server application. Polling request processing begins when a polling request is received from the receiving device 150 (block 252). When the polling request is received, the server application determines whether a message lock exists (block 254). If a message lock does not exist, the server application may send an IMPS polling request to the text message server (block 272). The server application at the payload and connection server 50 then receives a response from the IMPS server 20 (block 274), forwards the response to the receiving device 150 (block 276), and the process ends (block 278).

If a message lock does exist, the server application determines whether the voice instant message is available (block 256). If so, the server forwards the voice message to the receiving device 150 (block 258), releases the message lock (block 260), and stops the T1 timer (block 262). Polling request processing then ends (block 278). If no voice instant message is available when the polling request is received, the server starts timer T2 (block 264) and waits for the voice instant message to be received from the sending device 100. If the voice instant message is received before expiration of the timer (block 266), the server stops the T2 timer (block 268) and initiates message processing (block 280). If the T2 timer expires before the voice instant message is received from the sending device 100 (block 270), the server application may send an IMPS polling request to the text message server (block 272) as previously described. In this case, the server application at the payload and connection server 50 receives the response from the IMPS server 20 (block 274), forwards the response to the receiving device 150 (block 276), and the process ends (block 278).

FIG. 10 illustrates exemplary message processing 280. The message processing is initiated when a voice instant message is received (block 282). When a message is received, the server application determines if a message lock exists (block 284). If not, the server application sends an error message to the sending device 100 (block 286). If a message lock does exist, the server stops the T1 and T2 timers (block 288). The server application then determines whether a polling request from the receiving device 150 is pending (block 290). If no polling request is pending, meaning that no polling request has been received, the server application adds the message to a message queue (block 292). On the other hand, if a polling request is pending, the server application forwards the received voice instant message to the receiving device 150 (block 294) and releases the message lock (block 296). The process then ends (block 298).

Figure 11:
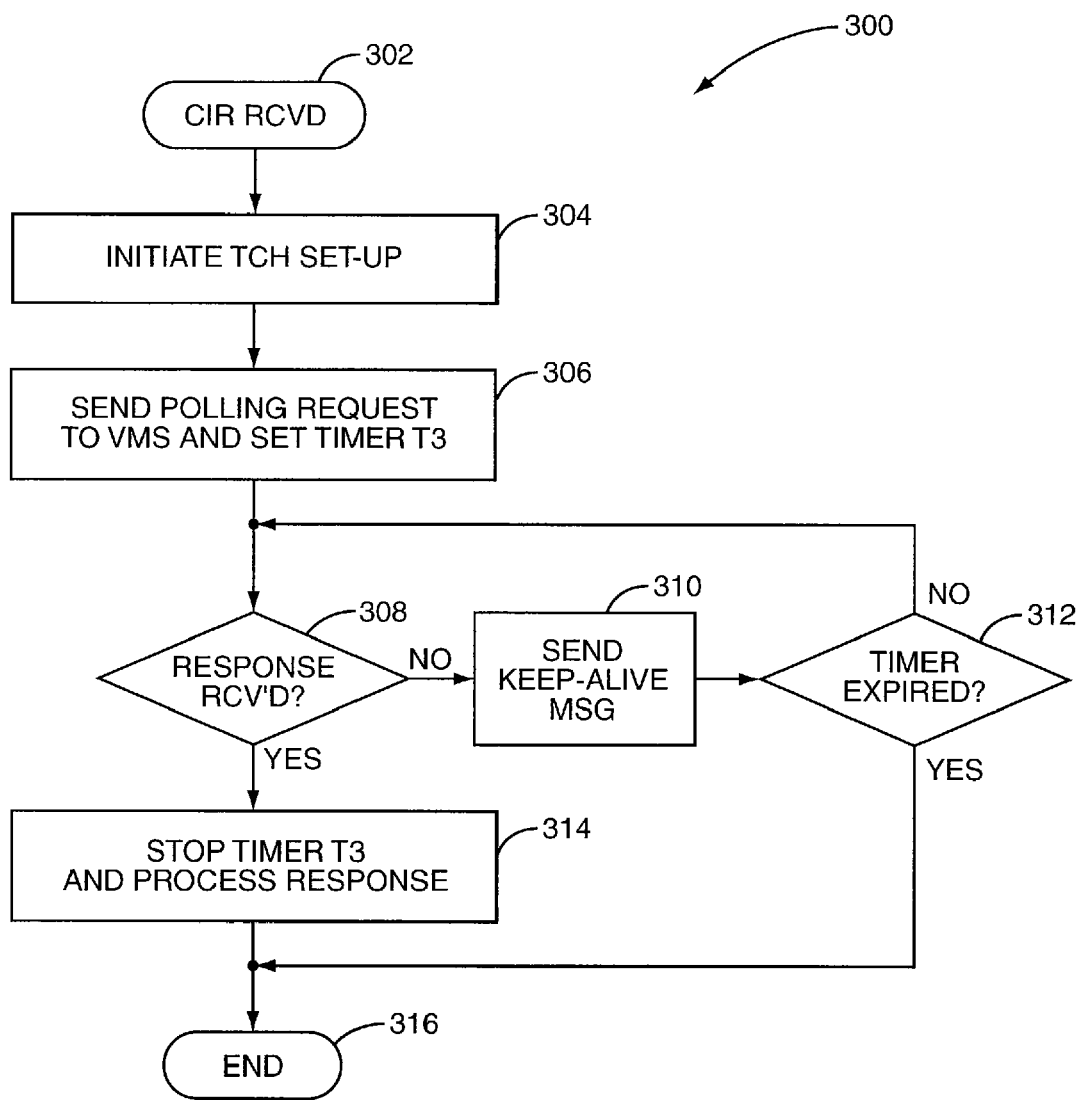
FIG. 11 illustrates a method implemented by a receiving device for receiving a voice instant message.

FIG. 11 illustrates an exemplary process 300 performed by a receiving device 150 for receiving voice instant messages. The process 300 is initiated when the receiving device 150 receives a CIR message or other notification that a voice or other instant message is pending (block 302). In response to the CIR or other notification, the receiving device 150 initiates traffic channel setup to establish a channel over which the voice instant message can be received (block 304). The receiving device 150 then sends a polling request to the payload and connection server 50 and sets a timer $T_3$ (block 306). If a response is received before the timer expires (block 308), the receiving device 150 stops the timer $T_3$ and processes the response to the polling request (block 310). The polling request response may contain a voice message, a video message, a text message, or other information. While waiting for the response, the receiving device 150 periodically sends a keep-alive message to the payload and connection server 50 to keep the TCP socket connection with the server open (block 310). When the timer expires (block 312), the receiving device 150 terminates the process (block 316).

Figure 12:
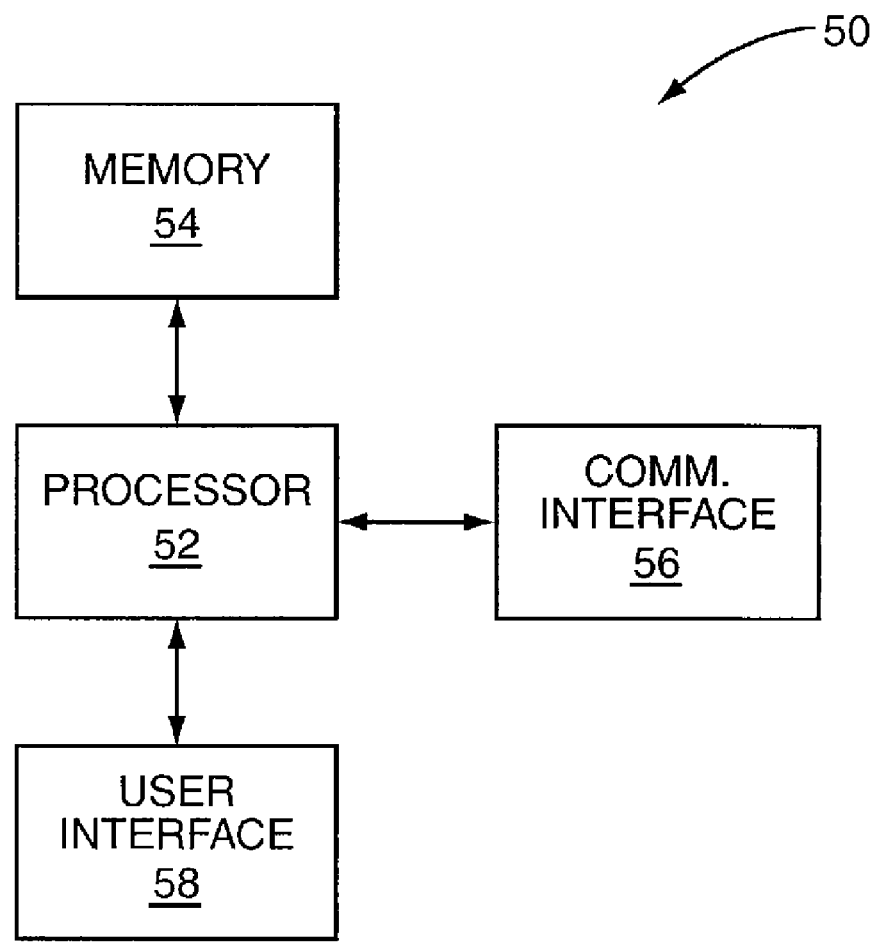
FIG. 12 is a block diagram of an exemplary payload and connection server.

FIG. 12 is a block diagram that illustrates some of the functional components of the payload and connection server 50 according to one embodiment of the present invention, which may be implemented as a program running on a computer. The payload and connection server 50 comprises a controller 52, memory 54, and communication interface 56. Controller 52 may comprise one or more microprocessors for executing a server application. The server application comprises data and instructions stored in memory 54 necessary to carry out the processes shown in FIGS. 7-10. The communication interface 56 enables the server application to communicate with IM clients and with other server applications via the Internet and/or other communication network. The payload and connection server 50 may also optionally include a user interface 58, such as a keyboard and display.

Figure 13:
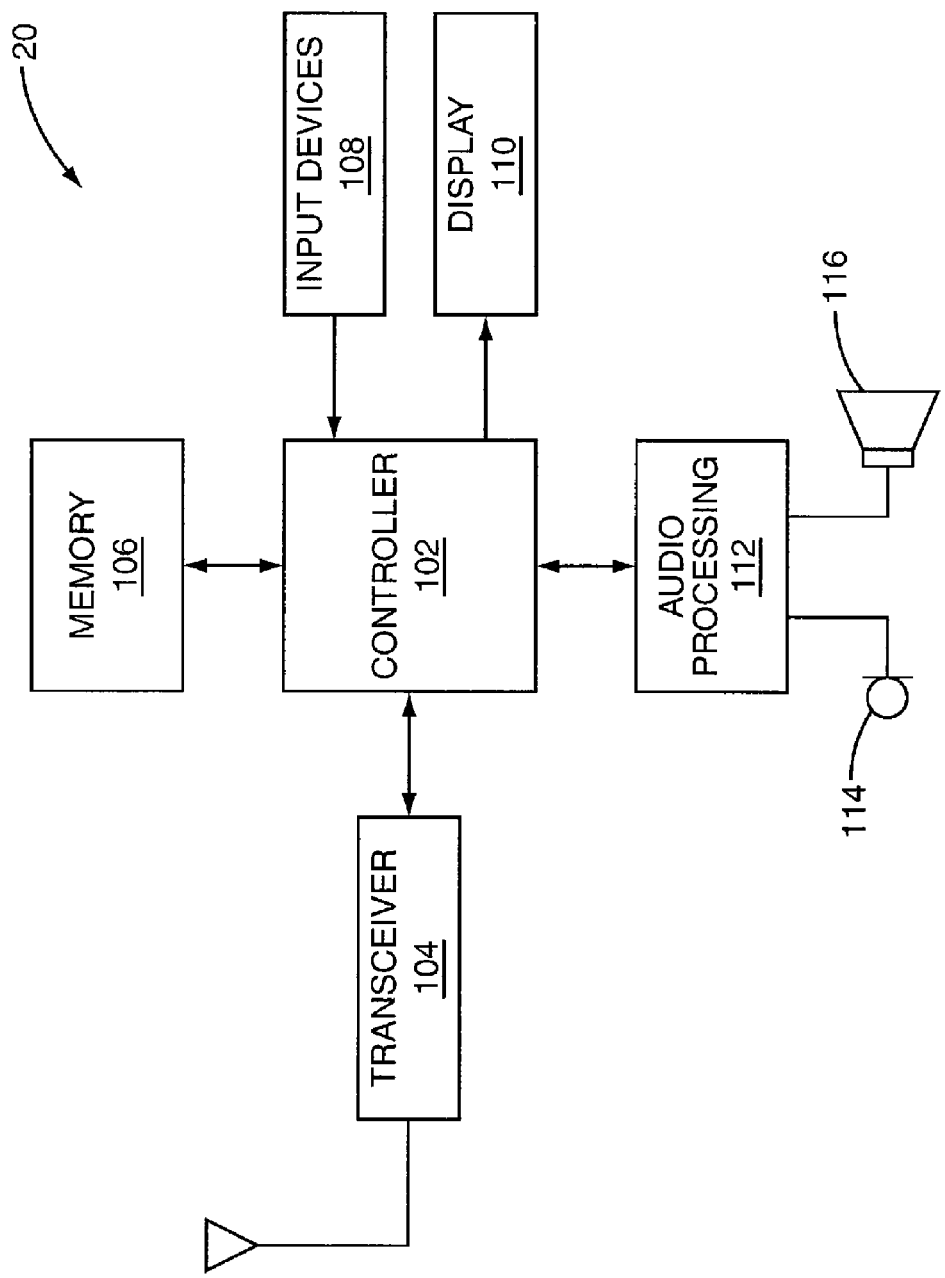
FIG. 13 is a block diagram of an exemplary mobile device that functions as both a sending device and a receiving device.

FIG. 13 illustrates an exemplary mobile device 300 according to the present invention, which may function as both a sending device 100 and a receiving device 150. Mobile device 300 comprises a controller 102, memory 104, a transceiver 106, one or more input devices 108, a display 110, audio processing circuits 112, a microphone 114, and speaker 116. The controller 102 may comprise one or more processors, hardware, firmware, or a combination thereof. Memory 104 comprises one or more memory devices and stores a Voice IM application and IM client. The Voice IM application comprises a user application with voice IM capabilities. The IM client functions as an IM user agent for communications between the Voice IM application and payload and connection server 50. The transceiver 106 comprises a fully functional cellular transceiver, which may operate according to any known or future standards, including GSM, WCDMA WiFi, WiMAX, etc. Input devices 108 and display 110 provide a user interface to enable the user to control and interact with the device. Input device 108 may, for example, comprise keypads, one or more function keys, touchpad, joystick control, etc. Display 110 may comprise a liquid crystal display. A touch screen display that also functions as an input device 108 could also be used. Audio processing circuits process voice and other audio signals input via microphone 114 or output to the speaker 116.

The present invention provides a method of reducing latency for media instant messaging by initiating traffic channel set-up before a user has completed creating a media instant message. The previous embodiments describe the media instant messages as being voice instant messages; however, this is for illustrative purposes only. The present invention may be employed to reduce latency in systems that communicate other types of media messages as well.

For example, in another embodiment, the media instant message comprises a text instant message. Using the above methods, the present invention may be employed to cause the receiving device 150 to establish a traffic channel to receive the text instant message while the user is still typing the text instant message at the sending device 100. In another embodiment, the media instant message comprises an instant message having an image or video clip. In such embodiments, the receiving device 150 could establish the traffic channel while the sending user was still capturing or editing the image or video clip as previously described.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method comprising:
   receiving a first instant message service request message from a sending device when an instant message is pending;
   causing, at least in part, creating a message lock for the pending message responsive to said first instant message service request message;
   causing, at least in part, initiating traffic channel set-up by a receiving device responsive to said first instant message service request message;
   receiving a polling request from the receiving device;
   determining if a message lock exists for the pending message in response to said polling request from said receiving device;
   determining to wait to receive said pending message from the sending device if a message lock exists;
   receiving the pending message from said sending device; and
   causing, at least in part, forwarding the pending message to the receiving device.

2. The method of claim 1 further comprising:
   determining to send a second polling request to an instant message server if no message lock exists;
   receiving a polling response to said second polling request from said instant message server; and
   causing, at least in part, forwarding said polling response from said instant message server to said receiving device.

3. The method of claim 1 wherein causing, at least in part, forwarding the pending message to the receiving device comprises including the pending message being forwarded to the receiving device within an instant messaging and presence service transaction using binary extensible markup language.

4. The method of claim 1 wherein causing, at least in part, initiating traffic channel set-up by a receiving device responsive to said instant message request message comprises sending a second instant message service request to an instant message server to initiate communication with said receiving device.

5. The method of claim 4 wherein said first instant message service request comprises a hypertext transfer protocol GET message, and wherein said second instant message service request comprises a hypertext transfer protocol POST message.

6. The method of claim 1 wherein the received polling request comprises a reduced size polling request, and further comprising causing, at least in part, maintaining the traffic channel with the receiving device responsive to the reduced size polling request.

7. An apparatus comprising:
at least one processor; and
at least one memory including computer program code for one or more programs, the at least one memory and the computer program code configured to, with at least one processor, cause the apparatus to perform at least the following,
receive a first instant message service request from a sending device;
cause, at least in part, to create a message lock for a pending message responsive to receipt of the first instant message service request message from the sending device;
cause, at least in part, to initiate traffic channel set-up by a receiving device responsive to said instant message service request message;
receive a polling request from the receiving device;
determine if a message lock exists for the pending message in response to said polling request from said receiving device;
determine to wait to receive said pending message from the sending device if the message lock exists;
receive the pending message from said sending device; and
cause, at least in part, to forward the pending message to the receiving device via the communication interface.

8. The apparatus of claim 7 wherein the apparatus is further caused to:
determine to send a second polling request to a remote instant message server if no message lock exists;
receive a polling response to said second polling request from said remote instant message server; and
cause, at least in part, to forward said polling response from said remote instant message server to said receiving device.

9. The apparatus of claim 7 wherein the apparatus is further caused to cause, at least in part, to include the pending message being forwarded to the receiving device within an instant messaging and presence service transaction using extensible markup language.

10. The apparatus of claim 7 wherein the apparatus causes, at least in part, to initiate the traffic channel set-up by a receiving device by sending a third instant message service request to a remote instant message server to initiate communication with said receiving device.

11. The apparatus of claim 10 wherein said first instant message service request message comprises a hypertext transfer protocol GET message, and wherein said second instant message service request comprises a hypertext transfer protocol POST message.

12. The apparatus of claim 7 wherein the received polling request comprises a reduced size polling request, and wherein the apparatus is further caused to cause, at least in part, to maintain the traffic channel with the receiving device responsive to receiving the reduced size polling request.

13. A method comprising:
determining when a media instant message is being generated;
causing, at least in part, sending an instant message service request to a media instant message server when the media instant message generation is detected and before the media instant message generation is complete; and
causing, at least in part, sending the media instant message to the media instant message server when generating the media instant message is complete.

14. The method of claim 13 wherein determining when a media instant message is being generated comprises determining when the media instant message is being generated at the mobile device.

15. The method of claim 14 wherein the media instant message being generated at the mobile device comprises a voice instant message, and wherein determining when the media instant message is being generated at the mobile device comprises determining a state of a record button on the mobile device.

16. The method of claim 13 further comprising causing, at least in part, delaying the start of the media instant message generation for a predetermined time period.

17. An apparatus comprising:
at least one processor; and
at least one memory including computer program code for one or more programs, the at least one memory and the computer program code configured to, with at least one processor, cause the apparatus to perform at least the following,
determine when a media instant message is being generated;
cause, at least in part, to send an instant message service request to a media instant message server when the media instant message generation is detected and before the media instant message generation is complete; and
cause, at least in part, to send the media instant message to the media instant message server when the media generation is complete.

18. The apparatus of claim 17 wherein the media instant message comprises a voice IM.

19. The apparatus of claim 18 further comprising a record button actuated by a user, and wherein said apparatus is further caused to determine the state of the record button to determine when the voice instant message is being recorded.

20. The apparatus of claim 17 wherein the apparatus is further caused to cause, at least in part, a delay of the start of the media instant message generation for a predetermined time period.

* * * * *